United States Patent [19]

McIntosh

[11] Patent Number: 4,514,002
[45] Date of Patent: Apr. 30, 1985

[54] TWO-POSITION BUMPER

[75] Inventor: Donald S. McIntosh, Davisburg, Mich.

[73] Assignees: John D. McIntosh; Mike Charles Giegler, both of Highland, Mich. ; part interest to each

[21] Appl. No.: 356,094

[22] Filed: Mar. 8, 1982

[51] Int. Cl.³ .............................................. B60R 19/02
[52] U.S. Cl. ..................................... 293/118; 293/155
[58] Field of Search ................. 293/27, 118, 119, 155, 293/10, 12; 280/763.1, 764.1, 765.1, 766.1, 462

[56] References Cited

U.S. PATENT DOCUMENTS

| | | | |
|---|---|---|---|
| 1,754,104 | 4/1930 | Hoffman | 293/119 |
| 2,129,438 | 9/1938 | Nitsche | 296/10 |
| 3,572,752 | 3/1971 | Harp | 280/764.1 |
| 3,588,160 | 6/1971 | Reiner . | |
| 3,709,542 | 1/1973 | Fehlau et al. | 293/118 |
| 3,801,128 | 4/1974 | Herndon | 280/763.1 |
| 3,847,427 | 11/1974 | Eshelman | 293/19 |
| 3,871,695 | 3/1975 | Koenig | 293/73 |
| 4,026,590 | 5/1977 | Holm | 293/118 |
| 4,138,152 | 2/1979 | Prue | 293/118 |
| 4,146,250 | 3/1979 | DenHerder | 280/765.1 |

FOREIGN PATENT DOCUMENTS

| | | | |
|---|---|---|---|
| 2352179 | 4/1975 | Fed. Rep. of Germany | 293/118 |
| 2843670 | 4/1980 | Fed. Rep. of Germany | 293/118 |

OTHER PUBLICATIONS

Predelivery Instructions for John Deere Surflex Disk Tillers 2200A Series.

Primary Examiner—Robert B. Reeves
Assistant Examiner—Dennis H. Pedder
Attorney, Agent, or Firm—Basile, Weintraub & Hanlon

[57] ABSTRACT

A two-position bumper for off the road vehicles is movable from a first position adjacent the vehicle frame to provide maximum ground clearance for cross country travel, to a second position deployed rearward and downward from the vehicle frame to serve as a conventional bumper to meet other vehicle bumpers at a proper level and to provide a trailer hitch at a suitable level for towing trailers. The two-position bumper comprises a cam plate affixed to the vehicle frame having a longitudinal slot formed therein and a pivoting longitudinal member having a front end, and a rear end with a cam follower pin laterally projecting from the front end to slidingly and pivotally engage the cam slot to support the front end of the longitudinal member. A rear pivot support is attached to the vehicle frame a distance rearward from the cam plate. An intermediate support arm is pivotally supported at an upper end by the rear pivot support and pivotally attached at a lower end to the pivoting longitudinal member. A bumper is attached to the rear end of the longitudinal member with the bumper movable from the first position against the frame to the second position deployed downward and rearward from the frame.

5 Claims, 7 Drawing Figures

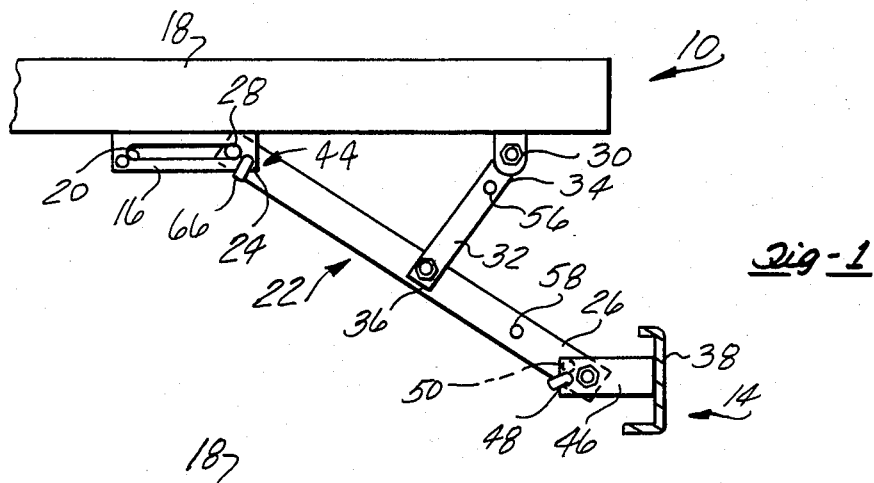
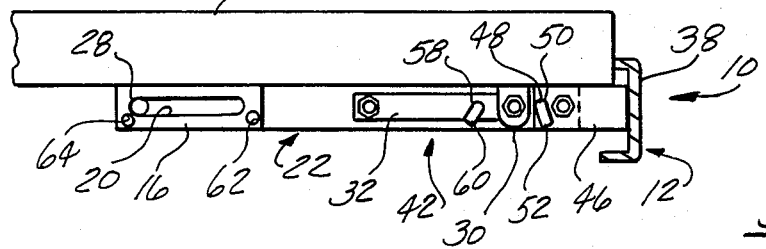
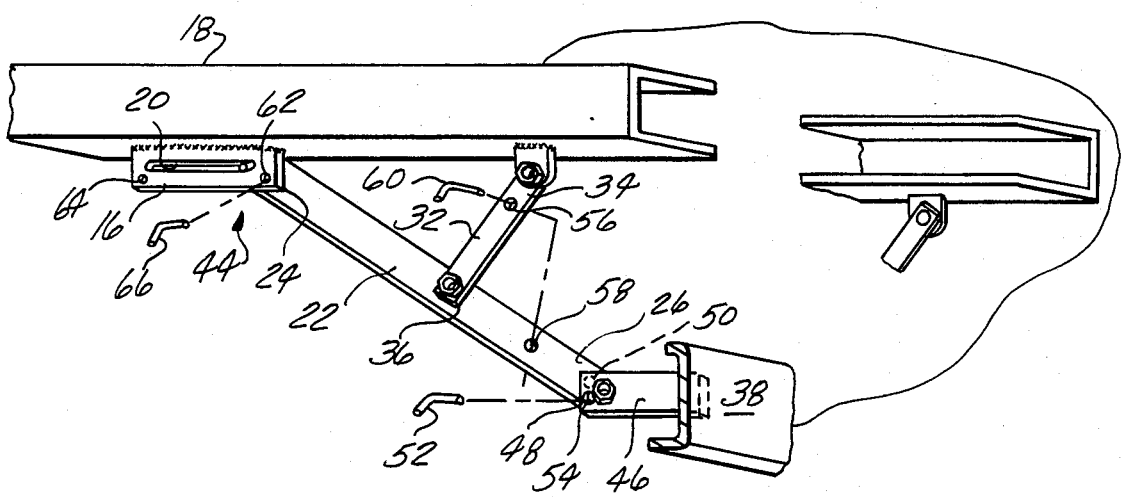

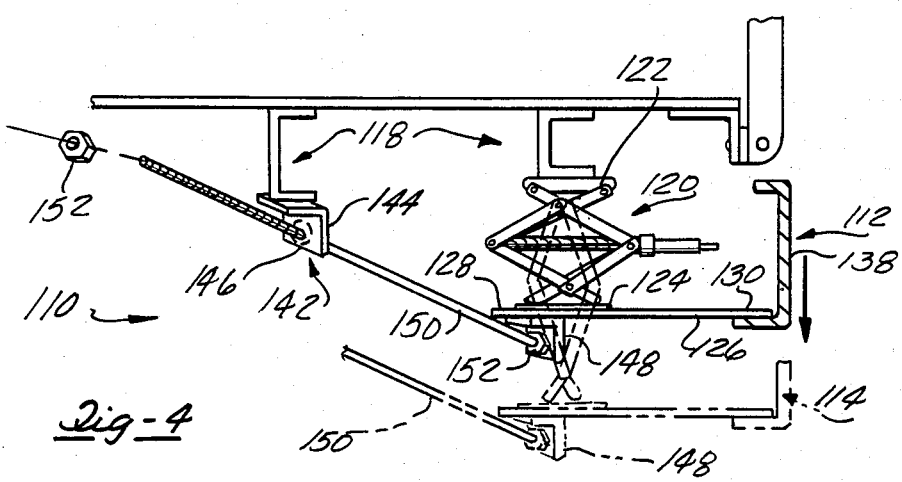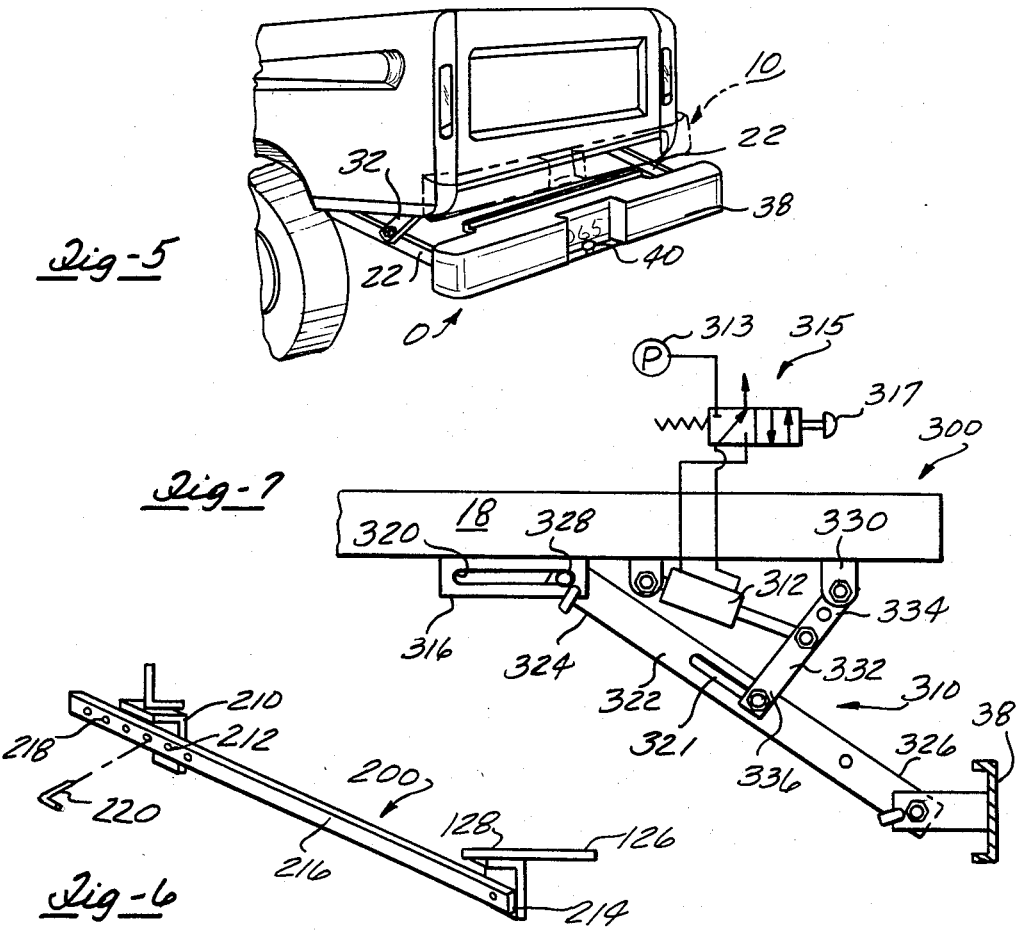

TWO-POSITION BUMPER

BACKGROUND OF THE INVENTION

I. Field of the Invention

The present invention generally relates to vehicles configured to be driven over the road and across country. In particular, the present invention is concerned with vehicles for over the road and cross country travel having a two-position bumper, with the bumper mounted in a first position for cross country travel and mounted in a second position for over the road travel.

II. Description of the Prior Art

Devices for selectively longitudinally positioning vehicle bumpers are known. Generally these devices comprises retractable bumpers that are deployed for a particular purpose and then retracted when not needed. Examples of retractable vehicle bumpers in the prior art are disclosed in the U.S. Pat. Nos. 3,588,160; 3,871,695; 1,754,104; and 3,847,427. These patents are relevant to the present invention in that they represent vehicle bumpers movable from a first position to a second position.

SUMMARY OF THE INVENTION

The present invention, which will be described in greater detail hereinafter, comprises a two-position bumper for off the road vehicles. The present invention includes a cam plate affixed to the vehicle frame having a longitudinal cam slot formed therein, and a pivoting longitudinal member including a front end, and a rear end with a cam follower pin laterally projecting from the front end to slidingly and pivotally engage the cam slot to pivotally and slidingly support the front end of the longitudinal member. A rear pivot support is attached to the vehicle frame a distance rearward from the cam plate, and an intermediate support arm is pivotally supported at an upper end by the rear pivot support and pivotally attached at a lower end to the pivoting longitudinal member. The bumper is attached to the rear end of the longitudinal member and is movable from a first position up against the frame to provide maximum ground clearance for off the road travel, to a second position downward and rearward from the frame where the bumper serves as a conventional bumper and is positioned to support a trailer hitch at a suitable level for towing trailers or other vehicles.

It is therefore a primary object of the present invention to provide a new and improved two-position bumper for vehicles that travel over the road and off the road.

It is a further object of the present invention to provide a two-position bumper which is positioned up against the vehicle frame to provide maximum road clearance for off the road travel, and is deployed downward and outward from the frame for over the road travel.

It is yet another object of the present invention to provide such a two-position bumper that in the over the road position is at a suitable height to meet bumpers of conventional vehicles.

It is yet a further object of the present invention to provide a two-position bumper that in the over the road position is at a suitable height for supporting a trailer hitch to tow vehicles in a safe manner.

It is yet a further object of the present invention to provide a new and improved two-position bumper for vehicles that travel over the road and off the road that is easily and inexpensively installed.

Further objects, advantages, and applications of the present invention will become apparent to those skilled in the art of the present invention when the accompanying description of one example of the best mode contemplated for practicing the invention is read in conjunction with the accompanying drawing.

BRIEF DESCRIPTION OF THE DRAWING

In the drawing like numbers refer to like parts throughout the several views and wherein;

FIG. 1 illustrates a side view of the two-position bumper of the present invention deployed to the over the road position;

FIG. 2 illustrates the two-position bumper of FIG. 1 moved to the off the road position;

FIG. 3 illustrates a broken perspective view of the two-position bumper of FIG. 1;

FIG. 4 illustrates a side view of an alternate configuration of a two-position bumper of the present invention;

FIG. 5 illustrates a pickup truck utilizing a two-position bumper of the present invention;

FIG. 6 illustrates an alternate means for securing the bumper of FIG. 4 in a first position and in a second position; and FIG. 7 illustrates the two-position bumper of FIG. 1 with a power cylinder added for easy movement of the bumper between the over the road position and off road position.

DESCRIPTION OF THE PREFERRED EMBODIMENT

Conventional vehicles such as pickup trucks designed primarily for over the road movement are usually converted for off road use by lowering the vehicles axles a distance and installing large diameter low pressure tires. This raises the vehicle a foot or more above the ground and provides substantial ground clearance for the vehicle to clear obstructions during cross crountry travel. This vehicle configuration, however, has several disadvantages for conventional over the road travel. The vehicle bumpers are raised a foot or more above their conventional height which can cause considerable damage in a minor collision with another vehicle having a bumper at conventional height which under normal circumstances would cause no damage. In addition, trailer hitches which are normally affixed to the vehicle bumper are carried at too great a height for safe and convenient towing. Furthermore the load bed of a pickup truck is carried at such a height that it is difficult and inconvenient for a person to climb upon the truck bed. These and other problems are conveniently solved by employing the device of the present invention.

Referring now to the drawing, and in particular to FIGS. 1, 2, 3, and 5, there is illustrated one example of the present invention in the form of two-position bumper 10 for vehicles that travel over the road and off the road. The two-position bumper 10 is adapted to be placed in a first position 12 (FIG. 2) for cross country travel; and placed in a second position 14 (FIG. 1) for over the road travel. The two-position bumper 10 comprises a cam plate 16 affixed to the vehicle frame 18 having a longitudinal slot 20 formed therein. A pivoting longitudinal member 22 includes a front end 24 and a rear end 26, with a cam follower pin 28 laterally projecting from the front end 24 to slidingly and pivotally engage the cam slot 20 and pivotally and slidingly support the front end 24 of the longitudinal member 22. A rear pivot support 30 is attached to the vehicle frame 18 a distance rearward from the cam plate 16, and an intermediate support arm 32 is pivotally supported at an upper end 34 by the rear pivot support 30, and pivotally attached at a lower end 36 to the pivoting longitudinal member 22. A bumper 38 supported by the rear end 26 of the longitudinal member 22 is movable from the first position 12 against the frame 18 to clear ground obstacles for off the road travel, to the second position 14 downward and rearward from the frame 18 to serve as a conventional bumper and support a trailer hitch 40 at a suitable level for towing trailers. A means 42 is provided for securing the bumper 38 in the first position 12, and a means 44 is provided for securing the bumper 38 in the second position 14 as will be described subsequently.

Referring now to FIGS. 1, 2, and 3 of the drawing, a bumper support 46 is pivotally attached to the rear end 26 of the longitudinal member 22 and is selectively pivotable from a first position extending rearward parallel to the axis of the longitudinal member 22 when the bumper 38 is in the first position 12, to a second position parallel with the ground as illustrated in FIGS. 1 and 3 when the bumper 38 is in the second position 14. A first aperture 48 formed in the bumper support 46 and is aligned with a second aperture 50 formed in the longitudinal member 22 when the bumper 38 and the bumper support 46 are in the first position. A first pin 52 slidingly engages the aligned first and second apertures 48, 50 to secure the bumper support 46 in the first position. A third aperture 54 formed in the longitudinal member 22 is aligned with the first aperture 48 when the bumper support 46 is in the second position, and the first pin 52 is slidingly engageable with the aligned first and third apertures 48, 54 to secure the bumper support in the second position.

Referring now to FIGS. 1, 2, and 3 of the drawing, the means 42 for securing the bumper 38 in the first position 12 comprises a fourth aperture 56 formed in the intermediate support arm 32 proximate the rear pivot support 30, and a fifth aperture 58 formed in the pivoting longitudinal member 22 which is aligned with the fourth aperture 56 when the bumper 38 is in the first position 2. A second pin 60 is slidingly engageable with the aligned fourth and fifth apertures 56, 58 when the bumper 38 is in the first position, to secure the bumper in the first position 12. The means 44 for securing the bumper 38 in the second position 14 comprises a sixth aperture 62 formed in the cam plate 16 which is aligned with a seventh aperture 64 formed in the first end 24 when the bumper 38 is in the second position 14, and a third pin 66 is slidingly engageable with the aligned sixth and seventh apertures 62, 64 to secure the bumper 38 in the second position 14.

Referring now to FIG. 4 of the drawing, there is illustrated an alternate embodiment of the two-position bumper of the present invention comprising a jack means 120 including an upper end 122 attached to a vehicle frame 118 and a movable lower end 124 which supports a longitudinally extending bumper support 126. The bumper support 126 includes a front end 128 attached to the movable lower end 124 of the jack means 120 and a rear end 130 supporting a bumper 138. The jack means 120 selectively moves the bumper 138 from a first position 112 adjacent the vehicle frame 118 to a second position 114 deployed downward from the frame 118. In the first position the bumper 138 clears objects on the ground, and in the second position 114 the bumper 138 is in a position to meet bumpers of other vehicles and to support a trailer hitch at the proper level for safely towing a trailer, etc. A means 142 is provided for supporting the bumper 138 in the first and second positions. The means 142 for securing the bumper support 110 in the first and second positions comprises a first bracket 144 supported by a forward central portion of the vehicle with a first opening 146 formed therethrough. A second bracket 148 with a second opening is attached to the front end 128 of the bumper bracket 126, and a support rod 150 threaded at its ends engages the first and second openings with nuts 152 threadingly engaging the threaded ends to secure the support rod ends to the first and second brackets 144 and 148.

Referring now to FIG. 6 of the drawing there is illustrated at 200 an alternate means for securing the bumper support 126 in the first and second positions. The alternate means 200 comprises a first cleat 210 supported by a forward central portion of the vehicle including a first pin receiving opening 212 formed therein, and a second cleat 214 attached to the front end of the bumper bracket 126. A support strut 216 is pivotally attached at the rear end to the second cleat 214, and a plurality of pin receiving openings 218 are formed in a front end of the support strut 216 to selectively align with the first pin receiving opening 212. A support strut pin 220 slidingly engages the first pin receiving opening 212 and one of the plurality of pin receiving openings 218 to selectively support the bumper 138 in the first and second positions.

For clarity of description and illustration, only a single device is shown in FIGS. 1, 2, 3, 4, 6 and 7 for moving the bumper between its first and second positions. It is obvious to the skilled artesian, however, that two or more brackets should preferably be used to provide greater strength and stability to the structure. It is not intended to limit the use of the device as shown and described to a single unit.

Referring now to FIG. 7 of the drawing, there is illustrated at 300 a two position bumper 310 that is adapted to be moved from a first-position for over the road travel to a second-position for off the road travel by means of a power cylinder 312. A cam plate 316 is affixed to the vehicle frame 18 and includes a longitudinal slot 320 formed therein. A pivoting longitudinal member 322 includes a front end 324 and a rear end 326 with a cam follower pin 328 laterally projecting from the front end 324 to slidingly and pivotally engage the cam slot 320 and slidingly support the front end 324 of the longitudinal member 322. A rear pivot support 330 is attached to the frame 18 a distance rearward from the cam plate 316, and an intermediate support arm 332 is pivotally supported at an upper end 334 by the rear pivot support 330 and pivotally and slidingly attached at a lower end 336 to the pivoting longitudinal member 322 by a cam slot 321. The bumper 38 is supported by the rear end 326 and is movable from the first position against the frame 18 to clear ground obstacles for off the road travel, to the second position downward and rearward from the frame 18 to serve as a conventional bumper to support a trailer hitch at a suitable level for towing trailers. Power operation of the power cylinder 312 is provided by a source of a fluid under pressure 313, for example, compressed air in an air tank. A two-position, four way valve 315 provides a control for directing fluid pressure to the power cylinder 312 to move the bumper 38 between the first-position against the frame 18 for cross country travel, to the second-position deployed below the frame 18 for over the road travel of the vehicle.

The two-position, four way valve 315 is spring biased to the position shown in FIG. 7 and both sides of the cylinder 312 are connected to atmosphere with the pressure port blocked. Gravity acting on the weight of the bumper 38 allows the bumper 38 to move to the over the road position as shown in FIG. 7. Pressing the button 317 moves the valve 315 against the spring and applys air pressure to the rod end of the cylinder 312 and exposes the cylinder end of the cylinder to atmospheric pressure causing the rod to move into the cylinder and deploy the bumper 38 upward to the cross country position. While an air powered power cylinder 312 is described hereinabove, its obvious to the skilled artesian that an hydraulically powered cylinder or an electrically powered ball screw could be used with equal facility to conveniently remove the bumper 38 between the over the road position and the cross country position.

It can thus be seen that the present invention has provided a new and improved two-position bumper for vehicles that are used for over the road and cross country conditions that can be easily and economically applied.

It should be understood by those skilled in the art of bumpers for over the road and cross country vehicles that other forms of the Applicant's invention may be had, all coming within the spirit of the invention and the scope of the appended claims.

Having thus described my invention what I claim is:

1. A two-position bumper for off the road vehicles comprising:
   a cam plate affixed to the vehicle frame and having a longitudinal cam slot formed therein;
   a pivoting longitudinal member including a front end and a rear end, a cam follower pin laterally projecting from the front end to slidingly and pivotally engage the cam slot and pivotally and slidingly support the front end of the pivoting longitudinal member;
   a rear pivot support attached to the vehicle frame a distance rearward from said cam plate;
   an intermediate support arm pivotally supported at an upper end by said rear pivot support and pivotally attached at a lower end to said pivoting longitudinal member;
   the bumper attached to said rear end of said longitudinal member, whereby the bumper is movable from the first position in proximity with and rearward of the vehicle frame to clear ground obstacles for off the road travel, to a second position downward and rearward from the vehicle frame, the bumper serving as a conventional bumper in both of the first and second positions;
   means for securing the bumper in the first position; and
   means for securing the bumper in the second position.

2. The two-position bumper as defined in claim 1 further comprising:
   a bumper support pivotally attached to the rear end of the longitudinal member;
   said bumper support being selectively pivotable from a first position extending rearward of and parallel to the axis of the longitudinal member when the bumper is in the first position, to a second position parallel with the ground when the bumper is in the second position, said bumper support including,
   a first aperture formed in said bumper support;
   a second aperture formed in said longitudinal member;
   said first aperture formed in the bumper support being aligned with said second aperture in the longitudinal member when the bumper and the bumper support are in their first positions, a first pin slidingly engaging the aligned first and second apertures to secure the bumper support in the first position; and
   a third aperture formed in the longitudinal member aligned with the first aperture when the bumper support is in the second position, the first pin being slidingly engageable with the aligned first and third apertures to secure the bumper support in the second position.

3. The two-position bumper as defined in claim 2 wherein the means for securing the bumper in the first position comprises:
   a fourth aperture formed in the intermediate support arm proximate the rear pivot support;
   a fifth aperture formed in the pivoting longitudinal member aligned with the fourth aperture when the bumper is in the first position; and
   a second pin slidingly engageable with the aligned fourth and fifth apertures to secure the bumper in the first position.

4. The two-position bumper as defined in claim 3 wherein the means for securing the bumper in the second position comprises:
   a sixth aperture formed in the cam plate aligned with a seventh aperture formed in the front end when the bumper is in the second position, a third pin slidingly engageable with the aligned sixth and seventh apertures to secure the bumper in the second position.

5. A two-position bumper for off the road vehicles comprising:
   jack means including an upper end attached to the vehicle frame and a movable lower end;
   a longitudinally extending bumper support including a front end attached to the movable lower end of the jack means and a rear end supporting the bumper;
   whereby the bumper is selectively movable from a first position adjacent to and rearward of the vehicle frame to clear objects on the ground, to a second position spaced substantially below and rearward of the frame a distance placing the bumper in a position to meet bumpers of other vehicles;
   means for securing said bumper support in the first and second positions having:
   a first cleat supported by a forward central portion of the vehicle, a first pin receiving opening formed therein;
   a second cleat attached to the front end of said bumper bracket;
   a support strut pivotally attached at a rear end to the second cleat, a plurality of pin receiving openings formed in a front end of said support strut to selectively align with said first pin receiving opening; and
   a support strut pin engaging the first pin receiving opening and one of said plurality of pin receiving openings to selectively support the bumper in the first and second positions.

* * * * *